Patented May 19, 1936

2,040,880

UNITED STATES PATENT OFFICE 2,040,880

PROCESS FOR THE PREPARATION OF FILMS AND FILAMENTS AND PRODUCTS THEREOF

George W. Rigby, Wilmington, Del., assignor to E. I. du Pont de Nemours & Company, Wilmington, Del., a corporation of Delaware No Drawing. Application June 21, 1934, Serial No. 731,601

21 Claims. (Cl. 18—54)

This invention relates to the preparation of films and filaments and similar unsupported structures and more particularly to the preparation of such structures from at least partially deacetylated but substantially undegraded chitin.

Chitin is a polymeric acetamino carbohydrate derivative occurring in the shells of various crustacea such as shrimps, crabs, lobsters, and the like, as well as in the horny exo-skeleton of various insects such as beetles, locusts, grasshoppers, and the like. Chitin has a structure related to that of cellulose, the glucose structural unit of the cellulose being replaced by an acetylated hexose-amine. On hydrolysis under regulated conditions, an at least partially deacetylated chitin may be prepared from purified chitin without substantial degradation. A completely deacetylated material has been obtained by drastic hydrolysis but this material has undergone substantial degradation. The subject is reviewed by Wester in Archiv der Pharmazie 247 282–307 (1909).

This invention has as an object the preparation of technically useful articles such as unsupported films and filaments from at least partially deacetylated substantially undegraded chitin. A further object is the further improvement of these films and filaments. Other objects will appear hereinafter.

These objects are accomplished by the following invention wherein a mass, swollen by but preferably in solution in dilute acid, of an at least partially deacetylated but substantially undegraded chitin, is coagulated in the form of a shaped object preferably having at least one dimention relatively large and one dimension relatively small, i. e., in the form of a film, thread, or a filament.

In the process of the present invention, solutions of at least partially deacetylated but substantially undegraded chitin are preferably used. The preparation of suitable solutions is shown in copending application Serial No. 731,600 filed June 21, 1934. In general, it may be stated that a partially deacetylated chitin of suitable properties may be obtained by regulated hydrolysis of a purified chitin. The method of purification disclosed in the above application consists first, in boiling the chitin-containing material with a 1% sodium carbonate solution for six hours, filtering, then treating with 5% hydrochloric acid solution to remove lime salts, filtering and again boiling with a 1% sodium carbonate solution, this time with the addition of a detergent material such as soap. The purified chitin thus obtained is at least partially deacetylated by heating with caustic solutions at elevated temperatures. The caustic may range in concentration from 5% to 60% by weight and the temperature as high even as 150° C., the higher concentrations of caustic requiring a lower temperature and/or a shorter time of deacetylation, thus approximately the same results are obtained with 5% caustic at 150° C. for twenty-four hours, 50% caustic at 100° C. for one hour, and 40% caustic at 100° C. for eighteen hours. The hydrolysis step is continued until a product at least swollen by but preferably soluble in dilute acetic acid is obtained, but is discontinued before the product becomes degraded. Products in which from .2 to .9 or even more of the acetyl groups have been removed by hydrolysis thus leaving from .2 to .9 or even more of the nitrogen as free amino are suitable, but for many purposes a product containing about 70% to 86% of the nitrogen in the form of the free amino group is preferred. The product containing only about .2 of its total nitrogen as free amino nitrogen is swollen, but not completely dissolved by dilute acetic acid. The viscosity of the final product may be controlled by the use of the different temperatures of deacetylation, different concentrations of caustic, different lengths of caustic treatment and by controlled oxidation, as for example, by the addition of small quantities of hydrogen peroxide or by bubbling air through solutions of deacetylated chitin. These treatments reduce the solution viscosity of the deacetylated chitin. The solution viscosity may also be increased by heating the dry deacetylated chitin as disclosed in the above application.

The solution of deacetylated chitin obtained by dissolving deacetylated chitin prepared as shown above in dilute acetic or other acids, may be cast, spun, extruded, etc., into various shapes in order to obtain the articles of the present invention.

Since deacetylated chitin is essentially a highly polymeric free primary amine it forms salts with acids. Many of these salts are water soluble. The following table lists some of the acids whose salts of deacetylated chitin have been prepared. These salts are prepared from substantially undegraded, partially deacetylated chitin containing about .8 free amino groups per chitosamine residue. The salts however may be prepared with other ranges of free amino content. Thus, deacetylated chitins with 70% to 86% of their nitrogen in the form of free amino groups are preferred altho products containing as low as 20% of the nitrogen in the form of free amino groups are at least swollen by dilute acid such as acetic acid.

Salts of deacetylated chitin

| Acid | Solubility of salt in water | Viscosity of 5% solution in water (poises) |
|---|---|---|
| 1. Acetic | Easily soluble | 66 |
| 2. Glycollic | Easily soluble | |
| 3. Maleic | Easily soluble | 83.6 |
| 4. Malonic | Easily soluble | |
| 5. Succinic | Slowly soluble | 646 |
| 6. Oxalic | Difficultly soluble | |
| 7. Phthalic | Slowly soluble | |
| 8. Benzoic | Easily soluble | |
| 9. Benzenesulfonic | Easily soluble | |
| 10. α-Bromo-n-butyric | Easily soluble | |
| 11. α-Bromo-n-propionic | Easily soluble | |
| 12. Phosphoric | Slightly soluble | |
| 13. Phenyl glycine | Slightly soluble | |
| 14. Iodoacetic | Easily soluble | |
| 15. Sulfanilic | Easily soluble | |
| 16. Formic | Easily soluble | |
| 17. Di-chloroacetic | Easily soluble | |
| 18. Pyruvic | Easily soluble | 735 |
| 19. Lactic | Easily soluble | |
| 20. Tartaric | Easily soluble | 29 |
| 21. Salicylic | Difficultly soluble | |
| 22. Adipic | Easily soluble | 71 |
| 23. Sebacic | Easily soluble | |
| 24. Sulfonsalicylic | Easily soluble | |
| 25. Citric | Easily soluble | 34 |
| 26. Malic | Easily soluble | 100 |
| 27. Lauric | Very slightly soluble | |
| 28. Fumaric | Slowly soluble | |
| 29. o-Benzoylbenzoic | Difficultly soluble | |
| 30. Diphenic | Difficultly soluble | |
| 31. Cinnamic | Difficultly soluble | |
| 32. Mandelic | Easily soluble | 107 |
| 33. Glutamic | Easily soluble | 82.8 |
| 34. Hippuric | Easily soluble | 910 |
| 35. Furoic | Easily soluble | 75.2 |
| 36. Phenylacetic | Easily soluble | |
| 37. Crotonic | Easily soluble | |
| 38. Caproic | Easily soluble | 712 |
| 39. Propionic | Easily soluble | 260 |
| 40. Butyric | Easily soluble | 219 |
| 41. Diethyl malonic | Easily soluble | |
| 42. Pelargonic | Difficultly soluble | |
| 43. Iso-valeric | Easily soluble | 275 |
| 44. Glycine | Difficultly soluble | |
| 45. Palmitic | Very slightly soluble | |
| 46. Terephthalic | Slightly soluble | |
| 47. Chloracetic | Easily soluble | |
| 48. α-Chloropropionic | Easily soluble | 121 |
| 49. α-Chloroisobutyric | Easily soluble | 73.3 |
| 50. Cyanuric | Very slightly soluble | |
| 51. Thioglycollic | Easily soluble | |
| 52. 3-nitrophthalic | Easily soluble | 48 |
| 53. α-Iodopropionic | Easily soluble | 139 |
| 54. Isobutyric | Easily soluble | 99 |
| 55. Naphthenic (Mol. Wt. 186) | Easily soluble | |
| 56. Naphthenic (Mol. Wt. 450) | Easily soluble | |
| 57. Linoleic | Difficultly soluble | |
| 58. Anthranilic | Easily soluble | 21.1 |
| 59. Furacrylic | Easily soluble | |
| 60. Hydroxy-iso-butyric | Easily soluble | 113 |
| 61. Sodium bisulfite | Difficultly soluble | |
| 62. Boric | Slightly soluble | |
| 63. Dithiocarbonic | Slowly soluble | |
| 64. Sulfurous | Easily soluble | |
| 65. Hydrochloric | Easily soluble | |
| 66. Hydrobromic | Easily soluble | |
| 67. Hydriodic | Easily soluble | |
| 68. Hypochlorous | Slowly soluble | |

Having outlined above the general processes of the invention, the following application thereof to certain substances are included for purposes of illustration and not in limitation.

*Example 1.*—Purified chitin is partially deacetylated by heating for six hours at 115° C. with 48 parts of 40% sodium hydroxide. The material is washed and dried and then 161 parts by weight of the deacetylated material is mixed with 48 parts of acetic acid and 3981 parts of water. The solution thus obtained is spread in a uniformly thick coating over a smooth, flat nickel sheet which has been heated to 90° C., at least. Warm, dry air is passed over the film until the moisture has been reduced to the point where the film is no longer sticky. The film is then removed from the supporting surface. It has a tensile strength of about 9000 pounds per square inch and is very flexible, tough, transparent, and clear.

*Example 2.*—Fifteen parts of purified chitin from crab shells is heated at 100° C. for five hours with 100 parts of 60% potassium hydroxide. The product is then washed and 161 parts by weight is dissolved in 48 parts by weight of acetic acid and 3981 parts by weight of water. The filtered solution is spread on a glass plate which is then immersed in a bath consisting of 1000 parts of water, 50 parts of sodium acetate and 20 parts of sodium hydroxide. The bath is preferably maintained above 70° C. As soon as coagulation has taken place throughout the film it is stripped from the supporting surface, washed free from all caustic and dried under tension. The film is clear, strong, flexible, with a tendency to become brittle if coagulated at temperatures lower than 70° C.

*Example 3.*—A solution of deacetylated chitin prepared as in Example 2 is passed through a small orifice into a coagulating bath consisting of 1000 parts of water, 50 parts of sodium acetate, 20 parts of sodium hydroxide and 2 parts of detergent consisting mainly of the sodium salts of the acid sulfuric acid esters of mixed higher molecular weight alcohols, principally dodecyl, the coagulating bath being heated to 70° C. The filaments thus prepared are washed free of caustic and dried under tension. They are lustrous, strong, flexible, and tough.

*Example 4.*—Purified chitin is heated for one hour at 100° C. with ten parts by weight of 50% sodium hydroxide solution and the product washed free of alkali, dried, and dissolved in 1½% acetic acid to make a 5% solution of deacetylated chitin having a viscosity of approximately 2800 poises. This solution is forced through an orifice into a warm atmosphere according to the well-known technique of dry spinning. The dry filament taken from the drying tower is soft to the feel and very tanacious.

*Example 5.*—A solution prepared by mixing three parts of partially deacetylated substantially undegraded chitin, three parts of phthalic acid, and 95 parts of 2% acetic acid is spread on a suitable glass plate covered with a microscopic film of graphite and dried at 50° C. for forty-eight hours. The film thus prepared is insensitive to water, is insoluble in dilute ammonia, and insoluble in 2% aqueous acetic acid.

*Example 6.*—A solution is prepared by dissolving 40 parts of substantially undegraded deacetylated chitin and 29 parts of maleic acid in 731 parts of water. To this solution are added four parts of camphor dissolved in ten parts of benzene and the mixture is stirred until a homogeneous emulsion is obtained. The solution is then spread on a nickel plate and dried at 50° C. The film thus prepared is soft, pliable, clear, and transparent.

*Example 7.*—A solution of three parts of substantially undegraded deacetylated chitin in 1.62 parts of maleic acid and 57 parts of water is spread on a nickel plate, dried at 50° C. and the film heated for twelve hours at 100° C. The film thus prepared is found to be completely insoluble in water and insoluble in 2% acetic acid.

*Example 8.*—A film of deacetylated chitin prepared according to Example 1 is heated in a mixture of 50 parts acetic anhydride and 50 parts of acetic acid at 100° C. for twelve hours. The film thus treated is insoluble in dilute acid and completely insoluble in water.

*Example 9.*—A film of deacetylated chitin prepared according to Example 1 is immersed in 5% solution of sodium hydroxide for ten minutes.

The film is then removed, washed completely free of caustic and dried under tension. It is found to be completely insoluble in water.

*Example 10.*—A film prepared according to Example 1 is immersed in a 5% formaldehyde solution for ten seconds, removed and dried under tension at 100° C. The film is completely insoluble in dilute acetic acid and in water. A film prepared according to Example 2 is immersed in a mixture of benzyl chloride and benzyl ether heated to 100° C. during five hours. The film is then immersed in dilute sodium hydroxide, washed until neutral, and then dried. It is found to be insoluble in water and less sensitive to moisture than the films prepared according to Example 2 or Example 1.

*Example 11.*—While this invention relates primarily to unsupported films and filaments prepared from deacetylated chitin, it is also possible to prepare objects in which all dimensions are relatively large. Thus, for example, one part of deacetylated chitin is dissolved in 19 parts of 1½% acetic acid containing one part of phthalic acid. This mixture is placed in a suitable vessel and heated at 50° C. for 24 hours. At the end of this time it will be found as a gelatinous material which may be further molded to an insoluble, three-dimensional object by applying heat and pressure.

In the above examples, certain definite conditions of preparation of the deacetylated chitin have been given but in general any at least partially deacetylated chitin prepared according to the process of copending application Serial Number 731,600 of June 21, 1934, may be used.

As supporting materials for the film before it has been dried any firm, smooth surface such as metal, glass, porcelain, etc., not sensitive to dilute acids may be used. Nickel, silver, stainless steel, glass covered with a film of graphite, and the like, may be used. Under special conditions it is possible to form a film by extruding very viscous solutions of deacetylated chitin either into a warm atmosphere or into a coagulating bath as disclosed in Example 2. Moreover, any medium in which deacetylated chitin is insoluble may be used as a medium in forming films and filaments.

As coagulating baths for deacetylated chitin there may be employed inert solvents, alkaline solutions or acid solutions. Thus, alcohol or acetone may be used as coagulating media as well as caustic media such as sodium hydroxide solutions, trisodium phosphate solutions, sodium silicate solutions, etc. Neutral salt solutions such as zinc sulfate solutions, sodium sulfate solutions, etc., may be used. Acid media suitable for preparing films and filaments include coagulating baths similar to the regular viscose coagulating baths which consist essentially of sulfuric acid together with sodium sulfate and zinc sulfate. After treatment of coagulated films should include treatments for the removal of all traces of the coagulating baths.

The temperature of coagulation may be varied within wide limits. In the case of simple evaporation of deacetylated chitin solutions, the temperature should be below the boiling point of the solution, for example, 100° C. in order to prevent bubble formation.

In place of the acetic acid, phthalic acid, or malic acid solutions of deacetylated chitin disclosed in the above example, solutions of the salts disclosed in copending application Serial Number 731,600, filed June 21, 1934, may be used. The insolubilizing of the deacetylated chitin films may be carried out by any process suitable for the preparation of acid insoluble derivatives of deacetylated chitin. Thus, heat may be used to form the acid chitosamide polymer from the acid salt, or acid anhydrides, or halides may likewise be used to give the acid amide. Thus, by treatment with acetyl chloride, acetic anhydride or ketone, a regenerated chitin is obtained, i. e., an acetyl derivative of a previously deacetylated chitin. This regenerated chitin will of course differ more or less from the original chitin as regenerated cellulose differs from its parent material. The acetylation may be more or less drastic, more drastic conditions of course leading to an acetyl derivative wherein more acetyl groups are present than nitrogen atoms, i. e., wherein the chitosamine hydroxyls are at least partially esterified. Aldehydes may be employed to give the aldehyde ammonia chitin or other insoluble products. Alkyl halides may likewise be used to give insoluble derivatives. All of these derivatives may be formed on the final film or filament without recourse to solution.

By the term "at least partially deacetylated chitin" is meant a chitin from which the acetyl groups have been removed at least in part or even, in the limiting case, completely.

By the term "substantially undegraded" is meant, as in cellulose chemistry, a polymeric material capable of depositing a coherent film from solution.

Films and filaments prepared according to the present invention are useful as wrapping materials, as textile materials, in ornamental articles and other uses similar to those of regenerated cellulose whether in sheet or film form. The unsupported films and filaments of deacetylated chitin have unique physical and chemical properties, high strength and elasticity and unique dyeing properties.

As many apparently widely different embodiments of this invention may be made without departing from the spirit and scope thereof, it is to be understood that I do not limit myself to the specific embodiments thereof except as defined in the appended claims.

I claim:

1. A process for the manufacture of shaped objects which comprises shaping a mass of an at least swollen salt of an at least partially deacetylated substantially undegraded chitin into the form desired and coagulating the same.

2. A process for the manufacture of shaped objects which comprises bringing a solution of a salt of an at least partially deacetylated substantially undegraded chitin into the form desired and coagulating said deacetylated chitin.

3. Process of preparing shaped objects, which comprises coagulating a mass of a solution in dilute acid of an at least partially deacetylated substantially undegraded chitin to a shaped object having at least one dimension relatively large and at least one dimension relatively small.

4. Process for the preparation of films and filaments from dilute acid solutions of at least partially deacetylated substantially undegraded chitin which comprises forming a shaped object of the class consisting of films and filaments from said solutions, and insolubilizing said shaped object by treatment with an insolubilizing agent.

5. Process for the preparation of films from deacetylated chitin solutions, which comprises coagulating a solution in dilute acid of at least partially deacetylated, substantially undegraded chitin.

6. Process for the preparation of films from deacetylated chitin solutions which comprises coagulating a solution in dilute acid of partially deacetylated substantially undegraded chitin, said solution containing a softening agent.

7. Process for the preparation of an article of the class consisting of films and filaments which comprises evaporating a solution in dilute acid of substantially undegraded at least partially deacetylated chitin in the form of the desired article.

8. A process for the manufacture of films which comprises bringing a solution in dilute acid of a substantially undegraded at least partially deacetylated chitin into the form of a film and insolubilizing said deacetylated chitin.

9. Process of preparing films, which comprises coating upon a smooth surface, a thin film of a solution in dilute acetic acid of partially deacetylated chitin, obtainable by heating purified chitin for six hours at 115° C. with forty-eight times its weight of 40% sodium hydroxide solution, drying said film by exposure to heat and dry air, removing the dried film from the smooth surface and insolubilizing the dried film by exposure to formaldehyde followed by heating.

10. Process of preparing films which comprises extruding through a small slit orifice into a coagulating bath, a solution in dilute acetic acid of partially deacetylated substantially undegraded chitin obtainable by heating purified chitin for five hours at 100° C. with approximately seven times its weight of 60% sodium hydroxide, into a coagulating bath comprising water, sodium acetate, and sodium hydroxide.

11. Process of preparing filaments which comprises extruding a solution in dilute acid of an at least partially deacetylated substantially undegraded chitin and coagulating said extruded solution.

12. Process of preparing filaments which comprises extruding through a small orifice, and thereafter coagulating, a solution in dilute acetic acid of partially deacetylated substantially undegraded chitin obtainable by heating purified chitin for five hours at 100° C. with approximately seven times its weight of 60% potassium hydroxide solution.

13. As new products artificially shaped objects comprising at least partially deacetylated substantially undegraded chitin.

14. A shaped object having at least one dimension relatively large and one dimension relatively small of substantially undegraded at least partially deacetylated chitin containing from .3 to .9 free amino group for each glucose amine residue of the deacetylated chitin.

15. A film comprising at least partially deacetylated substantially undegraded chitin.

16. A filament comprising at least partially deacetylated substantially undegraded chitin.

17. Process of preparing shaped objects, which comprises bringing a solution of a salt of a substantially undegraded partially deacetylated chitin containing 70% to 86% of its nitrogen in the form of free amino groups into the form desired and coagulating said deacetylated chitin.

18. Process of preparing shaped objects, which comprises coagulating a mass of a solution in dilute acid of a substantially undegraded partially deacetylated chitin containing 70% to 86% of its nitrogen as free amino groups to a shaped object having at least one dimension relatively large and at least one dimension relatively small.

19. Process for the preparation of films and filaments from solutions in dilute acid of a substantially undegraded partially deacetylated chitin containing 70% to 86% of its nitrogen in the form of free amino groups, which comprises forming a shaped object of the class consisting of films and filaments from said solutions, and insolubilizing said shaped object by treatment with an insolubilizing agent.

20. Process for the preparation of films from solutions in dilute acid of substantially undegraded partially deacetylated chitin containing 70% to 86% of its nitrogen as free amino groups, which comprises coagulating a solution in dilute acid of said deacetylated chitin in the form of a film.

21. Process for the manufacture of films, which comprises bringing a solution of a salt of a substantially undegraded partially deacetylated chitin containing 70% to 86% of its nitrogen in the form of free amino groups into the form of a film, and insolubilizing said deacetylated chitin.

GEORGE W. RIGBY.